United States Patent
Lindberg

(10) Patent No.: US 8,850,777 B2
(45) Date of Patent: Oct. 7, 2014

(54) WALL BOARD WITH EDGE STRIP AND METHOD FOR PRODUCTION THEREOF

(75) Inventor: Peter Lindberg, Örebro (SE)

(73) Assignee: P Lindberg Forvaltning AB, Orebro (SE)

( * ) Notice: Subject to any disclaimer, the term of this patent is extended or adjusted under 35 U.S.C. 154(b) by 0 days.

(21) Appl. No.: 13/985,811

(22) PCT Filed: Mar. 21, 2012

(86) PCT No.: PCT/SE2012/050315
§ 371 (c)(1),
(2), (4) Date: Oct. 11, 2013

(87) PCT Pub. No.: WO2012/134374
PCT Pub. Date: Oct. 4, 2012

(65) Prior Publication Data
US 2014/0026512 A1    Jan. 30, 2014

(30) Foreign Application Priority Data

Mar. 25, 2011 (SE) .................................. 1150266-3

(51) Int. Cl.
*E04C 2/26* (2006.01)
*B32B 3/14* (2006.01)
*E04C 2/04* (2006.01)
*E04F 13/08* (2006.01)
*E04C 2/38* (2006.01)

(52) U.S. Cl.
CPC . *E04C 2/38* (2013.01); *E04C 2/043* (2013.01); *E04F 2201/0153* (2013.01); *E04F 13/0866* (2013.01)
USPC ...................... 52/797.1; 52/745.19

(58) Field of Classification Search
CPC ............. E04C 2/24; E04C 2/043; E04C 2/46; E04B 2/723; E04F 15/107; B32B 3/08
USPC ........ 52/797.1, 796.1, 796.12, 802.11, 802.1, 52/800.1, 745.19
See application file for complete search history.

(56) References Cited

U.S. PATENT DOCUMENTS 2,263,930 A * 11/1941 Pasquier .......................... 428/53
2,399,666 A *  5/1946 Brynjulvsen .............. 52/783.13
(Continued)

FOREIGN PATENT DOCUMENTS

DE    2935259 A1    3/1980
EP    2096230 A1    9/2009
(Continued)

OTHER PUBLICATIONS

International Search Report for PCT/SE2012/050315, dated Apr. 18, 2012.

(Continued)

*Primary Examiner* — Christine T Cajilig
(74) *Attorney, Agent, or Firm* — W. Kevin Ransom; Moore & Van Allen PLLC

(57) ABSTRACT

A wall board is produced based on a body element, which essentially has the shape of a rectangular parallelepiped including two opposing main sides and four edge sides according to the following method: mechanical surface processing of a first edge side, wherein the first edge side attains a flat surface structure, which extends from a first to a second of the main sides; applying a first surface treatment layer on the first edge side; and arranging a first edge strip along the first edge side. The first edge strip contains: a first distal edge surface, a thereto opposing first proximal edge surface which is flat, and a first primary surface between the first proximal edge surface and the first distal edge surface, The first edge strip being arranged with the first proximal edge surface against the first edge side such that the first primary surface and the first main side of the body element form a first, flat and essentially unbroken surface. A first reinforcement layer is also applied on the first, flat and essentially unbroken surface, which first reinforcement layer covers the first main side and the first primary surface.

13 Claims, 3 Drawing Sheets

(56) References Cited

U.S. PATENT DOCUMENTS

| | | | |
|---|---|---|---|
| 2,620,527 A * | 12/1952 | Alenius | 52/578 |
| 2,717,187 A * | 9/1955 | Morgan et al. | 52/782.2 |
| 3,868,297 A * | 2/1975 | Jamison et al. | 428/593 |
| 4,147,004 A * | 4/1979 | Day et al. | 52/309.9 |
| 4,343,127 A * | 8/1982 | Greve et al. | 52/784.11 |
| 4,765,105 A * | 8/1988 | Tissington et al. | 52/309.11 |
| 5,310,435 A * | 5/1994 | Kelly | 156/182 |
| 5,462,623 A * | 10/1995 | Day | 156/250 |
| 5,613,342 A * | 3/1997 | Nelson | 52/782.2 |
| 5,624,728 A | 4/1997 | Hoopingarner et al. | 428/76 |
| 5,722,213 A * | 3/1998 | Morency | 52/784.11 |
| 5,887,398 A * | 3/1999 | Chen | 52/309.9 |
| 6,754,996 B2 * | 6/2004 | Komoriya | 52/177 |
| 7,621,102 B2 * | 11/2009 | Bartlett et al. | 52/784.1 |
| 7,836,655 B2 * | 11/2010 | Chen et al. | 52/592.1 |
| 7,877,953 B2 * | 2/2011 | Gauss | 52/745.19 |
| 8,176,704 B2 * | 5/2012 | Gauss et al. | 52/717.05 |
| 2003/0163972 A1 * | 9/2003 | Angenendt et al. | 52/793.1 |
| 2008/0127594 A1 * | 6/2008 | Kennedy | 52/630 |

FOREIGN PATENT DOCUMENTS

| | | |
|---|---|---|
| GB | 2423280 A | 8/2006 |
| WO | WO01/26899 A1 | 4/2001 |
| WO | WO2010/044728 A1 | 4/2010 |

OTHER PUBLICATIONS

International Preliminary on Patentability for PCT/SE2012/050315, dated Oct. 1, 2013.

* cited by examiner

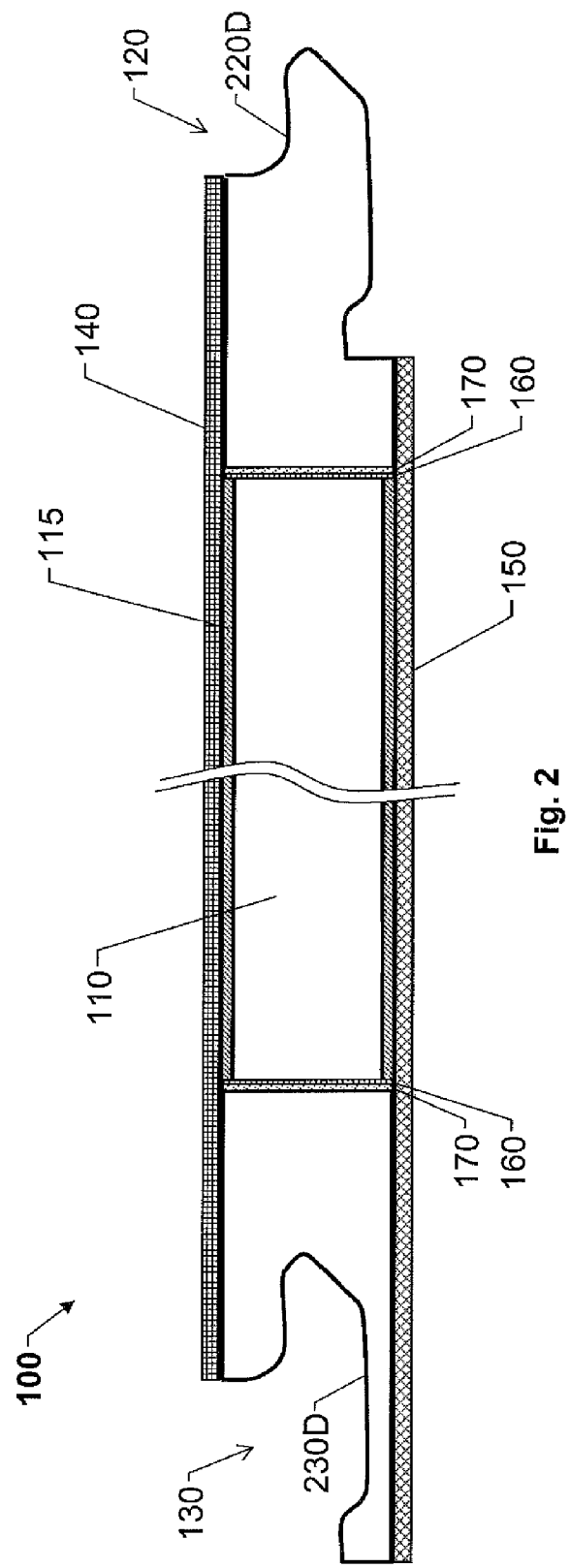

WALL BOARD WITH EDGE STRIP AND METHOD FOR PRODUCTION THEREOF

BACKGROUND OF THE INVENTION AND THE PRIOR ART

The present invention relates generally to solutions for mounting panelling onto a wall structure of a building. In particular, the invention pertains to a method for producing a wall board according to the preamble of claim 1 and a wall board according to the preamble of claim 13, which wall board has been produced according to the proposed method.

Today, there are many solutions for mounting panelling in the form of wooden panels and similar onto the inner walls of a house. Moreover, established methods exist for mounting other types of panelling in a room, such as plasterboards, fibreboards or boards of laminated wood. A common denominator of the latter methods is that these require particular measures to accomplish nice looking joints between the different wall elements of the panelling. To combine an aesthetically pleasant appearance of the finished wall with an uncomplicated and cost-efficient manufacturing of the panelling elements, and at the same time allow a simple mounting, has therefore proven to be especially challenging.

For example, WO 2010/044728 describes manufacturing of building boards, wherein a first reinforcement layer is arranged on a flat underlayer. Thereafter, edge strips are arranged primarily along two opposing sides of the reinforcement layer and a volume between the edge strips is filled with a hardenable substance, such as plaster. A second reinforcement layer is then arranged on top of the hardenable substance, where after said substance is caused to harden. As a result, a building board is attained having integrated edge strips, which preferably are adapted to allow efficient attachment to or more building boards onto a supporting structure, such as along a wall in a house.

PROBLEMS ASSOCIATED WITH THE PRIOR ART

The above-mentioned manufacturing of building boards renders it possible to accomplish building boards that both provide aesthetically appealing joints and have a robust design. Furthermore, the manufacturing method is very cost-efficient when the production line has been set up. However, the production line as such requires a relatively large investment, why a comparatively high manufacturing volume is needed to attain good profitability in the production.

SUMMARY OF THE INVENTION

The object of the present invention is therefore to provide a technically equivalent alternative to the above solution according to which less investment in the production line is required, and at the same time, the manufacturing cost per building board is kept at a reasonable level.

According to a first aspect of the invention, the object is attained by the method described initially, wherein the wall board is produced based on a body element, which essentially has the shape of a rectangular parallelepiped including two opposing main sides having relatively large delimitation surfaces and four edge sides having relatively small delimitation surfaces. The proposed method comprises mechanical surface processing of a first edge side of said edge sides of the body element, wherein the first edge side attains a flat surface structure which extends from a first to a second of said two main sides. A first surface treatment layer is applied on the first edge side, where after a first edge strip is arranged along the first edge side. The first edge strip comprises: a first distal edge surface, a thereto opposing first proximal edge surface which is flat, and a first primary surface between the first proximal edge surface and the first distal edge surface. Specifically, the first edge strip is arranged with the first proximal edge surface against the first edge side, such that the first primary surface and the first main side of the body element form a first, flat and essentially unbroken surface. A first reinforcement layer is applied on the first, flat and essentially unbroken surface, which first reinforcement layer covers the first main side and the first primary surface.

This manufacturing method is advantageous, since it produces a wall board in a very cost-efficient manner, where the wall board has an integrated edge strip with properties comparable to those attained when the edge strip is molded into the wall board.

According to one embodiment of this aspect of the invention, the body element initially includes a surrounding layer, which covers at least the edge sides. The mechanical surface processing of the first edge side here involves removal of the surrounding layer from the first edge side. Thereby, good application of the edge strip against the body element can be guaranteed. Most important, however, the above-mentioned first, flat and essentially unbroken surface may thereby be made very flat.

According to another embodiment of this aspect of the invention, the method further comprises applying a first adhesive layer on the surface treatment layer and/or the first proximal edge surface before the first edge strip is arranged along the first edge side. Such fastening of the edge strip is advantageous because it both provides good resistance of the finished wall board and prevents undesired movement of the edge strip relative to the body element during the manufacturing process.

According to yet another embodiment of this aspect of the invention, the method comprises profiling work of the first distal edge surface. The first edge strip thus attains a final cross-section profile after that the edge strip has been integrated into the body element. Specifically, the first edge strip is here given a cross-section profile configured to engage a second edge strip belonging to another wall board, which is attached to a wall structure and thereby accomplish attachment of the wall board into which the first edge strip is included to the wall structure.

Performing profiling work on the edge strip after integration into the body element is especially advantageous if the profiling work involves modifying the first primary surface and/or a thereto opposing first secondary surface of the first edge strip. Namely, in such a case, very good adaption of the first reinforcement layer can be accomplished. Moreover, by performing profiling work after that the edge strip has been integrated into the body element, one has good control over the final outer measures of the wall board towards the edge strip. By the profiling work, this measure can be established down to a precision of one tenth of a millimeter.

According to a further embodiment of this aspect of the invention, before applying the first reinforcement layer, the method comprises mechanical surface processing of a second edge side of said edge sides of the body element. The second edge side is parallel with the first edge side, and attains, via the mechanical surface processing, a flat surface structure extending from the first main side to the second edge side. Analogous to the above, the method also involves applying a second surface treatment layer on the second edge side. Then, a second edge strip is arranged along the second edge side.

The second edge strip comprises a second distal edge surface and a second proximal edge side opposite thereto which is flat, and a second primary surface between the second proximal edge surface and the second distal edge surface. Specifically, the second edge strip is arranged with the second proximal edge surface against the second edge side, such that the second primary surface and the body element's first main side form an extension of the first, flat and essentially unbroken surface. Thereafter, the first reinforcement layer is applied on the extended first, flat and essentially unbroken surface, such that the first reinforcement layer covers the first main side, the first primary surface and the second primary surface. Hence, a wall board with opposing integrated edge strips is attained, which wall board is functionally equivalent to a wall board where the edge strips have been molded in.

According to a further embodiment of this aspect of the invention, it is presumed that the body element initially includes a surrounding layer, which covers the edge sides. The mechanical surface processing of the second edge side involves removal of the surrounding layer from the second edge side. Thereby, a good contact between the second edge strip and the body element is guaranteed. Moreover, the extended first, flat and essentially unbroken surface may thereby be made very flat.

According to yet another embodiment of this aspect of the invention, the method comprises applying a second adhesive layer on the second surface treatment layer and/or the second proximal edge surface before the second edge strip is arranged along the second edge side. This is advantageous since the finished wall board thereby attains good resistance and any undesired movement of the edge strip in relation to the body element during the manufacturing process can also be prevented.

According to a further embodiment of this aspect of the invention, the method also comprises profiling work of the second distal edge surface after integration thereof into the body element. The second edge strip attains a cross-section profile configured to engage a first edge strip belonging to another wall board, which is attached to a wall structure and thereby accomplish attachment of the wall board into which the second edge strip is included to the wall structure. Consequently, the wall board is adapted to an aesthetically and efficient mounting.

Preferably, the profiling work of the second edge strip also involves modifying the second primary surface and/or a second secondary surface opposite thereto of the second edge strip. Performing profiling work this way is advantageous for the same reasons as stated above referring to the first edge strip.

According to yet another embodiment of this aspect of the invention, the first secondary surface of the first edge strip is arranged such that the first secondary surface and the body element's second main side form a second, flat and essentially unbroken surface. The method further comprises applying a second reinforcement layer on the second, flat and essentially unbroken surface, which second reinforcement layer covers the second main side and the first secondary surface. Thereby a wall board is attained that has a first edge strip whose attachment is practically invisible from both sides of the wall board.

According to a further embodiment of this aspect of the invention, the second edge strip is arranged with the second proximal edge surface against the second edge side, such that the second primary surface and the body element's second mains side form an extension of the second, flat and essentially unbroken surface. The second reinforcement layer is here applied on the extended second, flat and essentially unbroken surface such that the second reinforcement layer covers the second main side, the first secondary surface and the second secondary surface. Thereby, also the attachment of the second edge strip becomes practically invisible from both sides of the wall board.

According to a second aspect of the invention, the object is attained by the wall board described initially, wherein the wall board comprises: an inner layer covering the first main side of the body element, however not the first primary surface of the first edge strip; and a first reinforcement layer covering the inner layer over the first main side and the first primary surface of the first edge strip.

This wall board is advantageous since its edge strip allows an uncomplicated mounting against an abundance of materials, frames and wall structures. The proposed edge strip may also provide a joint-free appearance of a mounted wall surface including wall boards of the proposed type. By suitable design of the edge strip and the reinforcement layer it is also possible to render the wall board diffusion-proof. Additionally, it is possible to build a heavy, sound isolating wall board of concrete or glass with an absorbing surface layer, which is easy to mount since it does not require through-drilling.

BRIEF DESCRIPTION OF THE DRAWINGS

The present invention will now be described more closely through embodiments, which are described as examples, and with reference to the attached drawings.

FIG. 2 shows one embodiment of a wall board produced by the proposed method.

DESCRIPTION OF PREFERRED
EMBODIMENTS OF THE INVENTION

Figure 1A:
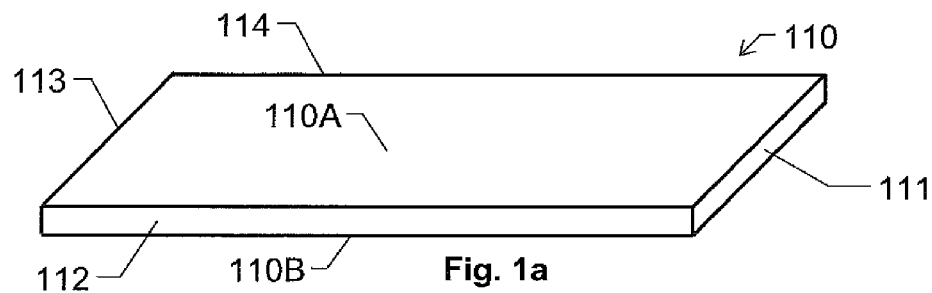
FIG. 1a-e illustrate schematically how a wall board is produced according to one embodiment of the invention.

We refer initially to FIG. 1a, which schematically shows a body element 110 arranged to constitute the basis for a wall board 100 according to the invention. The body element 110 may preferably be composed of, or mainly include, a brittle material, such as plaster or a ceramic material; a hard material, such as glass or concrete; or a soft material, such as mineral wool or cardboard. In any case, the body element 110 is presumed to have the shape of a rectangular parallelepiped including two opposing main sides 110A and 110B respectively with relatively large delimitation surfaces and four edge sides 111, 112, 113 and 114 respectively with relatively small delimitation surfaces. Furthermore, it is presumed that the edge sides 111, 112, 113 and 114 are difficult to process due to the brittleness, hardness or softness of the material in the body element 110. This, in turn, results in that it is problematic to modify the edge sides 111, 112, 113 and 114, such that a desired edge profile is attained (for example for mounting on a wall structure and to allow aesthetically appealing joints between different wall boards).

In a first step of the production method according to the invention, mechanical processing of a first edge side 111 of the body element's 110 edge sides takes place for example via sawing, cutting, milling or grinding. The choice of mechanical processing is primarily determined by the material in the body element 110. If this is composed of plaster, the mechanical processing may involve sawing or milling, while if it is composed of a ceramic material, glass or concrete, then grinding is normally more suitable. If, on the other hand, the body element 110 is composed of mineral wool or cardboard, the mechanical processing preferably involves cutting. Hereby, the first edge strip 111 attains a flat surface structure, which extends from a first 110A to a second 110B of said main sides. Preferably, the mechanical processing gives the flat surface of the first edge side 111 a straight angle towards both the main sides 110A and 110B. According to the invention, however, any other angle relationship between the main sides 110A and 110B and the flat surface of the first edge side 111 is equally possible.

According to one embodiment of the invention, the body element 110 is presumed to initially include a surrounding layer 115 that covers at least the edge sides 111, 112, 113 and 114 (see FIG. 2). If the body element 110 is composed of a plaster board, the surrounding layer 115 is typically represented by a reinforcement layer, which surrounds all the side surfaces 110A, 110B, 111, 112, 113 and 114. The mechanical surface processing of the first edge side 111 here involves removal of the surrounding layer 115 from the first edge side 111. In case the body element 110 is composed of a plaster board, the edge line between the first main side 110A and the edge sides 111, 112, 113 and 114 respectively is also normally somewhat rounded, why the mechanical surface processing aims at accomplishing sharp angles between the main sides 110A and 110B and the flat surface of the first edge side 111. Namely, good application of the first edge strip 120 against the body element 110 it is thereby guaranteed with a minimally visible joint.

Figure 1B:
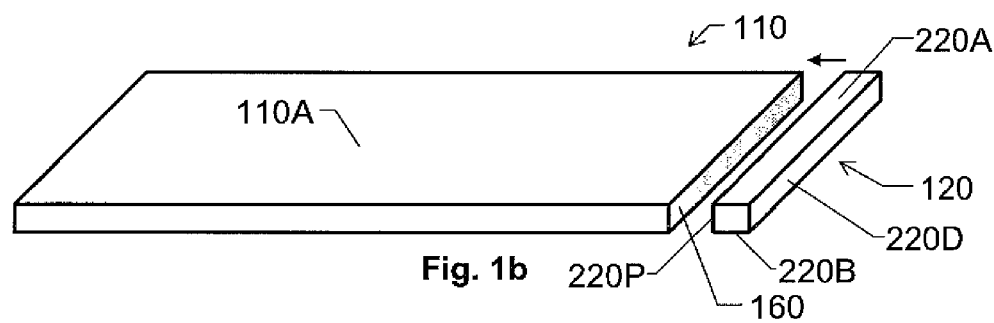

FIG. 1b shows the body element 110 together with a first edge strip 120 adapted to be arranged along the first edge side 111. Before the first edge strip can be applied against the body element 110, however, a first surface treatment layer 160 is applied on the first edge side 111 aiming at rendering the body element 110 suited to be connected to the first edge side 111. Since the mechanical surface processing may have involved removal of a protecting and/or unifying layer from the first edge side 111, the first surface treatment layer 160 preferably contains glue, a primary color or a so-called primer.

The first edge strip 120 comprises: a first distal edge surface 220D, a thereto opposing first proximal surface 220P that is flat, and a first primary surface 220A between the first proximal edge surface 220P and the first distal edge surface 220D.

The first edge strip 120 may for example be manufactured of aluminium, plastic, rubber, wood or MDF (Medium Density Fibreboard), and may either be unprocessed (and thus essentially have the shape of a rectangular parallelepiped as illustrated in FIG. 1b-e) or be profiled (and for example have a cross-section profile where the first distal edge surface 220D is configured to facilitate an aesthetically appealing connection of the wall board 100 to a wall structure).

In any case, the production method according to the invention comprises arranging the first edge strip 120 with the first proximal edge surface 220P against the first edge side 111, such that the first primary surface 220A and the body element's 110 first main side 110A form a first, flat and essentially unbroken surface. It is thus advantageous if the body element's 110 thickness agrees with the distance between the first edge strip's 120 first primary surface 220A and a thereto opposing first secondary surface 220B.

FIG. 2 shows one embodiment of a finished wall board 100 produced through the proposed method, where a first adhesive layer 170 is located between the surface treatment layer 160 and the first edge strip 120. In the production of the wall board the first adhesive layer 170 is thus applied at least on one of the surface treatment layer 160 and the first proximal edge surface 220P before the first edge strip 120 is arranged along the first edge side 111.

Figure 1C:
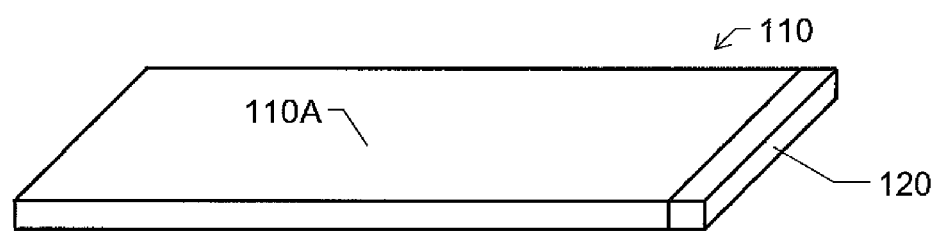

FIG. 1c shows how the first edge strip 120 is joined with the body element 110, such that the first edge strip 120 covers the entire first edge side 111. If necessary, either the body element 110 or the edge strip 120 is length adapted, such that the first edge strip's 120 measure along the body element 110 agrees with the length of the first edge side 111.

Figure 1D:
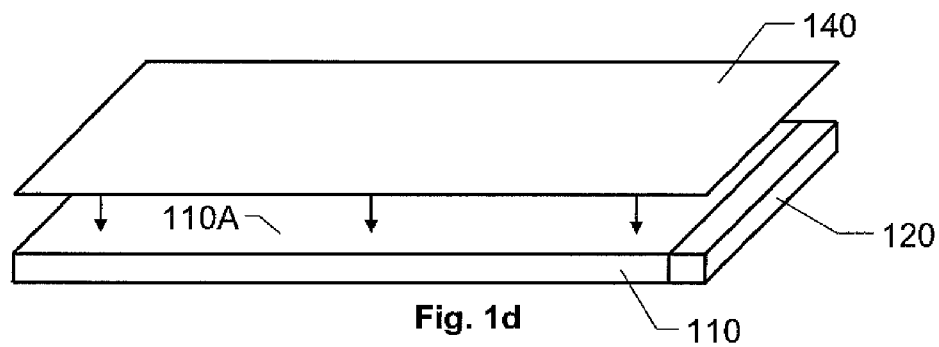
Figure 1E:
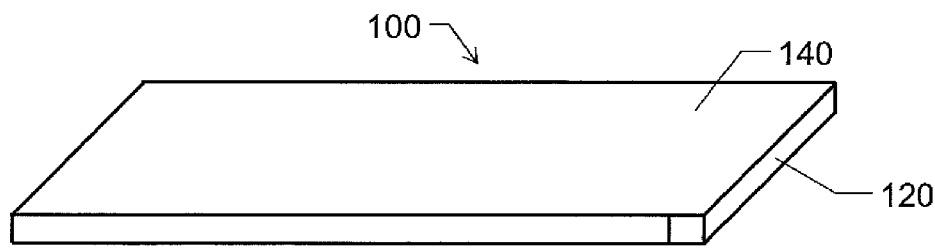

After joining the first edge strip 120 with the body element 110 the production method according to the invention comprises applying a first reinforcement layer 140 on the first, flat and essentially unbroken surface (see FIG. 1d). Specifically, the first reinforcement layer 140 is placed such that it covers the first main side 110A and the first primary surface 220A of the first edge strip 120. As a result thereof, a very flat surface of the wall board 100 is accomplished. This is illustrated in FIG. 1e.

According to a preferred embodiment of the invention, the first distal edge surface 220D of the edge strip 120 is profiling worked after that the first reinforcement layer 140 has been applied. Namely, thereby, it can be guaranteed that the first reinforcement layer is given such an extension that it ends exactly where the first primary surface 220A transitions into the first distal edge surface 220D (see FIG. 2). Through the profiling work the first edge strip 120 attains a cross-section profile configured to engage a second edge strip 130 belonging to another wall board, which is fastened at a wall structure, and thereby accomplish connection to the wall structure of the wall board 100 in which the first edge strip 120 is included. The first distal edge surface 220D therefore preferably has a curve shaped cross-section profile including a projection adapted to allow angling of the wall board 100 towards the wall structure after that the projection has been inserted into a groove represented by a second distal edge surface 230D of the second edge strip 130. Consequently, the profiling work preferably also involves modifying at least one of the first primary surface 220A and the first secondary surface 220B of the first edge strip 120.

The method for, starting from a body element 110 and a first edge strip 120, attaining a wall board 100 with a profiled side edge for mounting onto a wall structure has been described above with reference to FIGS. 1a-e and 2. In practice, of course, it is highly advantageous if each wall board 100 is provided with at least two opposing, profiled sides edges, such that a number of wall boards 100 can be successively connected to one another along a wall structure. Such a mounting, in turn, presupposes that a first side of the wall board 100 has a profiled side edge of male type (see e.g. 220D in FIG. 2) and a second side of the wall board 100 has a profiled side edge of female type (see e.g. 230D in FIG. 2). In some applications, such as when coating facades, it may also be advantageous with profiles along three or four of the wall board's 100 side edges.

Below, we will describe how the wall board 100, according to embodiments of the invention, is provided with a second profiled side edge. Before applying the first reinforcement layer 140 the method here involves mechanical processing of a second edge side 113 of the body element 110. The second edge side 113 is parallel with the first edge side 111, and through the mechanical surface processing attains a flat surface structure, which extends from the first main side 110A to the second main side 110B.

Analogous to the above it is presumed, according to one embodiment of the invention, that the body element 110 includes a surrounding layer 115, which covers at least the edge sides 111, 112, 113 and 114. Normally, however, any such a surrounding layer also covers the main sides 110A and 110B. In such a case, the mechanical surface processing of the second edge side 113 involves removal of the surrounding layer 115 from the second edge side 113.

A second surface treatment layer 160, for example in the form of glue, a primary color or a so-called primer, is then applied on the second edge side 113, where after a second edge strip 130 is arranged along the second edge side 113. The second edge strip 130 comprises a second distal edge surface 230D and a thereto opposing second proximal edge surface that is flat. The second edge strip 130 also comprises a second primary surface between the second proximal edge surface and the second distal edge surface 230D. The second edge strip 130 is arranged with the second proximal edge surface against the second edge side 113, such that the second primary surface and the body element's 110 first main side 110A form an extension of said first, flat and essentially unbroken surface.

Preferably, the method also comprises applying a second adhesive layer 170 on at least one of the second surface treatment layer 160 and the second proximal edge surface before the second edge strip 130 is arranged along the second edge side 113. Such fastening of the second edge strip 130 is advantageous because it both provides good resistance of the finished wall board 100 and prevents undesired movement of the second edge strip 130 relative to the body element 110 during the manufacturing process.

After having fastened the second edge strip 130 at the body element 110, the first reinforcement layer 140 is applied on the first, flat and essentially unbroken surface, such that the first reinforcement layer 140 covers the first main side 110A, the first primary surface 220A and the second primary surface.

In similarity to the first edge strip 120, it may be advantageous to perform profiling work on the second edge strip 130 after integration into the wall board 100. According to one preferred embodiment of the invention, the production method therefore comprises performing profiling work on the second distal edge surface 230D, whereby the second edge strip 130 attains a cross-section profile configured to engage a first edge strip 120 belonging to another wall board, which, in turn, is attached to a wall structure. Thereby, the wall board 100 in which the second edge strip 130 is included becomes attached to the wall structure. Analogous to the above discussion concerning the first edge strip 120, the profiling work of the second edge strip 130 preferably involves modifying the second primary surface and/or a thereto opposing second secondary surface.

In many applications, it is desirable that also the body element's 110 second main side 110B forms a flat and essentially unbroken surface together with the first edge strip and any second edge strip 130. According to one preferred embodiment of the invention, the first secondary surface 220B of the first edge strip 120 is therefore arranged such that the first secondary surface 220B and the body element's 110 second main side 110B form a second, flat and essentially unbroken surface. The production method preferably also comprises application of a second reinforcement layer 150 on the second, flat and essentially unbroken surface, which second reinforcement layer 150 covers the second main side 110B and the first secondary surface 220B.

Correspondingly, the second edge strip 130 is preferably arranged with the second proximal edge surface against the second edge side 113, such that the second primary surface and the body element's 110 second main side 110B form an extension of the second, flat and essentially unbroken surface. Then, the second reinforcement layer 150 is applied on the extended, second, flat and essentially unbroken surface, such that the second reinforcement layer 150 covers the second main side 110B, the first secondary surface and the second secondary surface.

Figure 3:
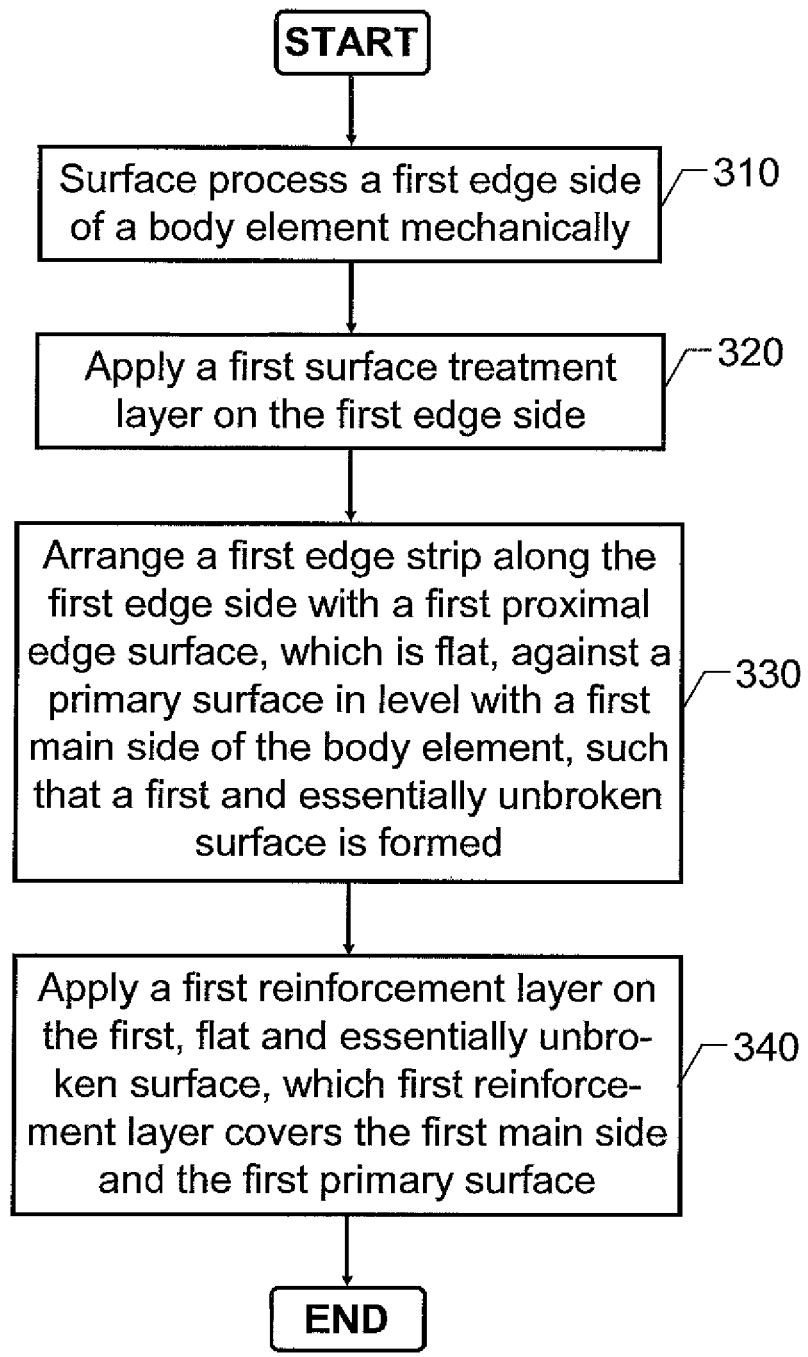
FIG. 3 shows a flow chart over the general production method according to the invention.

In order to sum up, we will now describe the general production method according to the invention with reference to the flow chart in FIG. 3.

A first step 310 surface processes a first edge side of a body element mechanically, for example by sawing, cutting or milling. A second step 320 thereafter applies a first surface treatment layer, such as a primary color, glue or a so-called primer, on the first edge side. In a later step 330, a first edge strip is arranged along the first edge side with a first proximal surface, which is flat, against the first edge side. Further, a primary surface of the first edge strip is arranged in level with the first main side of the body element's first main side, such that a first and essentially unbroken surface is formed by the body element's first main side and the primary surface. In a final step 340, a first reinforcement layer is applied on the first, flat and essentially unbroken surface in such a manner that the first reinforcement layer cover the entire first main side an the entire first primary surface.

The invention is not limited to the embodiments, which have been described above with reference to the Figures, however can be varied freely within the scope of the following claims.

The invention claimed is:

1. A method for producing a wall board for mounting on a wall structure, wherein the wall board is produced based on a body element which essentially has the shape of a rectangular parallelepiped including two opposing main sides having relatively large delimitation surfaces and four edge sides having relatively small delimitation surfaces, the method comprising:

mechanical surface processing of a first edge side of said edge sides of the body element, which comprises removal from the first edge side a surrounding layer covering the first edge side, and wherein said mechanical surface processing attains a flat surface structure on the first edge side that extends from a first to a second of said two main sides;

applying a first surface treatment layer on the first edge side;

arranging a first edge strip along the first edge side, the first edge strip comprising:
a first distal edge surface,
a thereto opposing first proximal edge surface which is flat, and
a first primary surface between the first proximal edge surface and the first distal edge surface, and
the first edge strip is arranged with the first proximal edge surface against the first edge side such that the first primary surface and the first main side of the body element form a first, flat and essentially unbroken surface; applying a first reinforcement layer on the first, flat and essentially unbroken surface, which first reinforcement layer covers the first main side and the first primary surface;

mechanical surface processing of one second edge side of said edge sides of the body element, which second edge side is parallel with the first edge side, wherein the second edge side attains a flat surface structure extending from the first main side to the second edge side;

applying a second surface treatment layer on the second edge side;

arranging a second edge strip along the second edge side, the second edge strip comprising a second distal edge surface and a second proximal edge side opposite thereto which is flat, and a second primary surface between the second proximal edge surface and the second distal edge surface, and the second edge strip being arranged with the second proximal edge surface against the second edge side such that the second primary surface and the body element's first main side form an extension of the first, flat and essentially unbroken surface; and applying the first reinforcement layer on the extended first, flat and essentially unbroken surface such that the first reinforcement layer covers the first main side, the first primary surface and the second primary surface.

2. The method according to claim 1, further comprising applying a first adhesive layer on at least one of the first surface treatment layer and the first proximal edge surface before the first edge strip is arranged along the first edge side.

3. The method according to claim 1, further comprising profiling work of the first distal edge surface, wherein the first edge strip attains a cross-section profile configured to engage a second edge strip belonging to another wall board which is attached to a wall structure and thereby accomplish attachment of the wall board into which the first edge strip is included to the wall structure.

4. The method according to claim 3, wherein the profiling work involves modifying at least one of the first primary surface and a first secondary surface opposite thereto of the first edge strip.

5. The method according to claim 4, wherein the body element initially includes a surrounding layer which covers the second edge, side and wherein the mechanical surface processing of the second edge side involves removal of the surrounding layer from the second edge side.

6. The method according to claim 4, further comprising applying a second adhesive layer on at least one of a second surface treatment layer and the second proximal edge surface before the second edge strip is arranged along the second edge side.

7. The method according to claim 5, comprising profiling work of the second distal edge surface, wherein the second edge strip attains a cross-section profile configured to engage a first edge strip belonging to another wall board which is attached to a wall structure and thereby accomplish attachment of the wall board into which the second edge strip is included to the wall structure.

8. The method according to claim 7, wherein the profiling work involves modifying at least one of the second primary surface and a second secondary surface opposite thereto of the second edge strip.

9. The method according to claim 5, wherein the first secondary surface of the first edge strip is arranged such that the first secondary surface and the body element's second main side form a second, flat and essentially unbroken surface, and the method further comprises:

applying a second reinforcement layer on the second, flat and essentially unbroken surface, which second reinforcement layer covers the second main side and the first secondary surface.

10. The method according to claim 9, wherein:

the second edge strip is arranged with the second proximal edge surface against the second edge side such that the second primary surface and the body element's second mains side form an extension of the second, flat and essentially unbroken surface, and the second reinforcement layer is applied on the extended second, flat and essentially unbroken surface such that the second reinforcement layer covers the second main side, the first secondary surface and the second secondary surface.

11. A wall board configured to be mounted on a wall structure, the wall board comprising:

a body element which essentially has the shape of a rectangular parallelepiped including two opposing main sides having relatively large delimitation surfaces and four edge sides having relatively small delimitation surfaces, and a first edge strip arranged along a first edge side of the body element, wherein a surrounding layer initially covering the first edge strip has been removed by mechanical surface processing, wherein said first edge strip comprises a first distal edge surface, a thereto opposing first proximal edge surface which is flat and fitted directly against a flat surface of the first edge side, wherein a first primary surface between the first proximal edge surface and the first distal edge surface form a flat and essentially unbroken surface together with the first main side of the body element;

an inner layer covering exclusively the first main side of the body element;

a first reinforcement layer covering the inner layer over the first main side and the first primary surface of the first edge strip; and a second edge strip arranged along the second edge side, which is parallel with the first edge side, the second edge strip comprising a second distal edge surface and a second proximal edge side opposite thereto which is flat, and a second primary surface between the second proximal edge surface and the second distal edge surface, and the second edge strip being arranged with the second proximal edge surface against the second edge side such that the second primary surface and the body element's first main side form an extension of the first, flat and essentially unbroken surface, wherein the first reinforcement layer being applied on the extended first, flat and essentially unbroken surface such that the first reinforcement layer covers the first main side, the first primary surface and the second primary surface.

12. The wall board according to claim 11, wherein the body element comprises at least one of: a ceramic material, plaster, glass, concrete, mineral wool or cardboard.

13. The wall board according to claim 11, wherein the first edge strip is essentially composed of one of: aluminum, plastic, rubber, wood and MDF (Medium Density Fiberboard).

* * * * *